US006260480B1

(12) United States Patent
Bardeen

(10) Patent No.: US 6,260,480 B1
(45) Date of Patent: Jul. 17, 2001

(54) EGG CLEANING AND DECORATING METHOD AND KIT THEREFOR

(76) Inventor: Kea L. Bardeen, 2628 E. 5th Ave., Denver, CO (US) 80206

( * ) Notice: Subject to any disclaimer, the term of this patent is extended or adjusted under 35 U.S.C. 154(b) by 0 days.

(21) Appl. No.: 09/334,475

(22) Filed: Jun. 16, 1999

(51) Int. Cl.[7] .............................. A23L 1/00; A23N 1/00; A23B 5/00; A47J 17/00; A47J 43/14
(52) U.S. Cl. ............................. 99/495; 99/532; 99/536; 99/568; 99/584
(58) Field of Search ........................... 99/472, 456, 495, 99/516, 532, 536, 533, 506, 538, 568, 567, 584; 30/120.1; 15/353; 434/81

(56) References Cited

U.S. PATENT DOCUMENTS

| | | | |
|---|---|---|---|
| 2,445,490 | * | 7/1948 | Meade ..................................... 99/495 |
| 2,594,619 | * | 4/1952 | Bosch ...................................... 99/495 |
| 2,735,464 | * | 2/1956 | Kerven ................................... 99/495 |
| 3,090,412 | * | 5/1963 | Conrad ................................... 99/495 |
| 3,249,137 | * | 5/1966 | Conrad ................................... 99/495 |
| 3,855,915 | | 12/1974 | Hoyt et al. . |
| 4,182,234 | | 1/1980 | Reed . |
| 5,289,762 | | 3/1994 | Phillips . |
| 5,297,477 | | 3/1994 | Phillips . |
| 5,317,962 | | 6/1994 | Phillips . |

OTHER PUBLICATIONS

"Egg Crafting", p. 166, origin unknown, date unknown.

* cited by examiner

*Primary Examiner*—Timothy F. Simone
(74) *Attorney, Agent, or Firm*—Timothy J. Martin; Michael R. Henson; Mark H. Weygandt

(57) ABSTRACT

An egg cleaning kit is provided for removing contents of a raw egg from the interior of a shell so that the shell's exterior surface may be decorated. The kit includes a hole-former for producing an opening through the shell, and an injector including a nozzle that is insertable through the opening. The injector operates to introduce air into the interior at a pressure greater than ambient pressure whereby the interior becomes pressurized thereby to eject the contents of the raw egg from the shell. The egg cleaning kit may also include either a surface decoration material adapted to be applied to the exterior surface of the shell during the decorative process, a holder for engaging the shell after removal of the contents and for supporting the shell during the decorative process, or a container which includes a lid for allowing submersion of the shell in the decorative fluid. A method of treating a raw egg for decorative purposes is also provided.

28 Claims, 5 Drawing Sheets

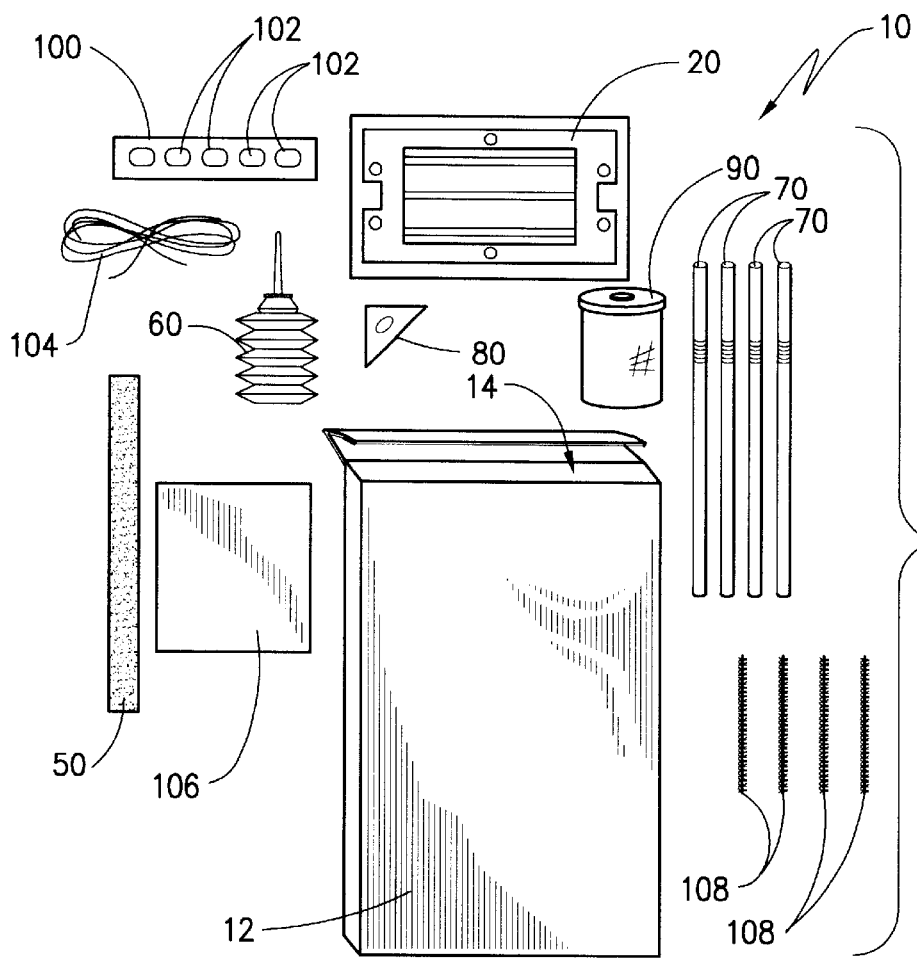
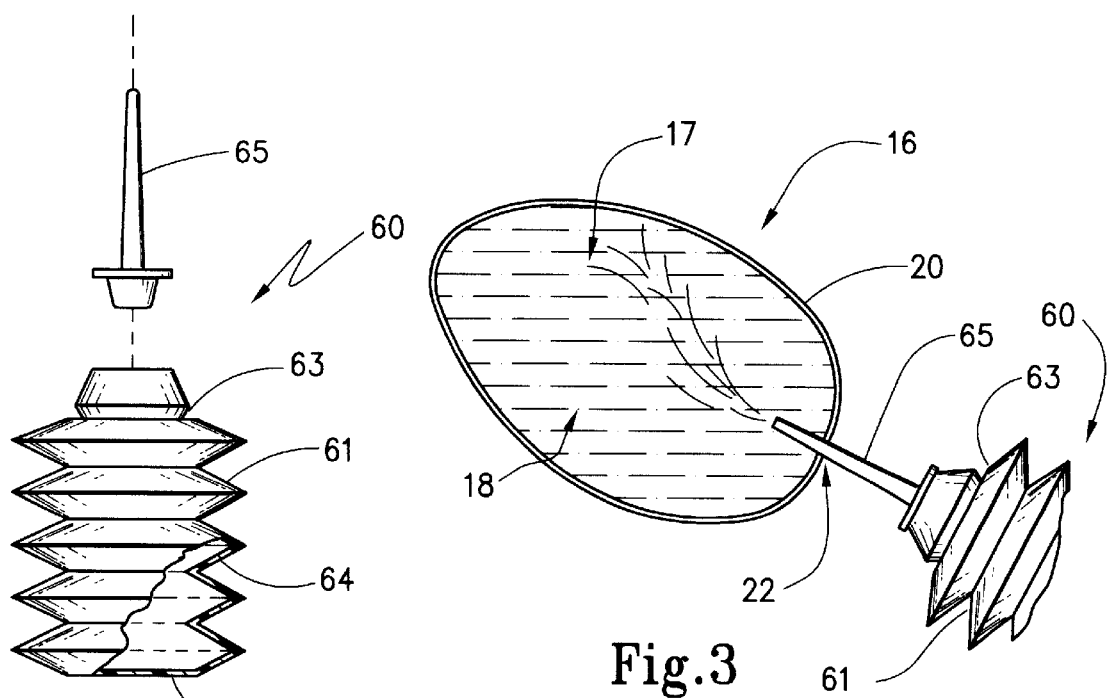
Fig.1
Fig.2
Fig.3

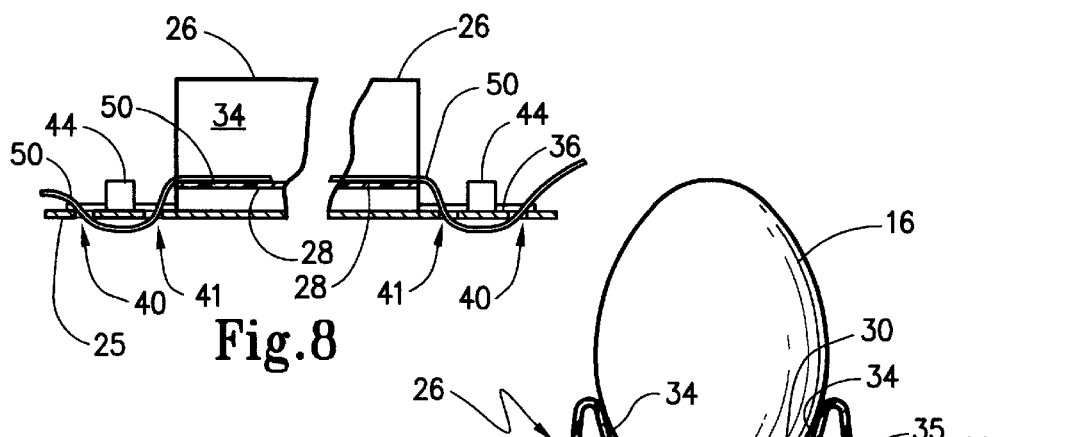
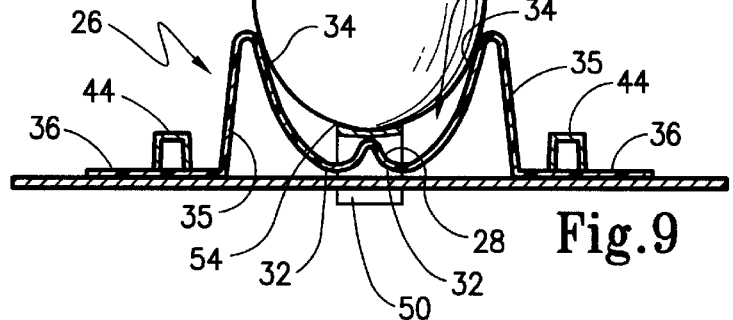
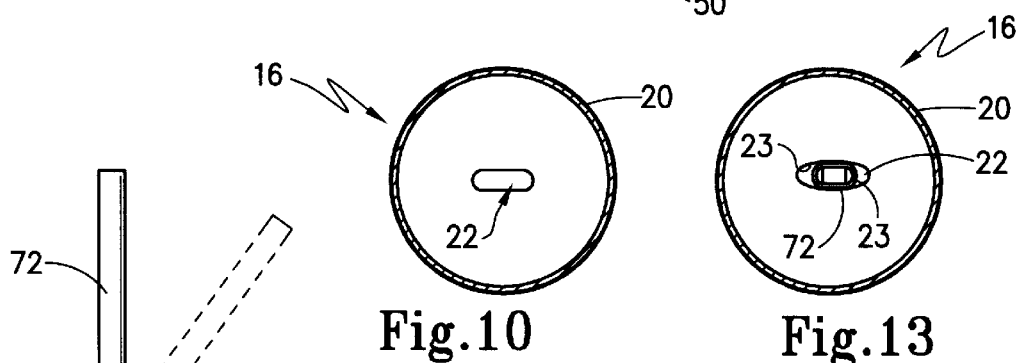
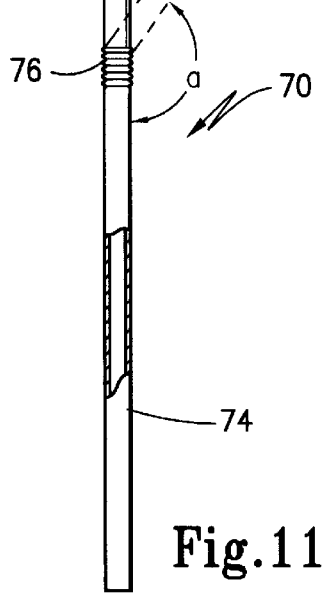
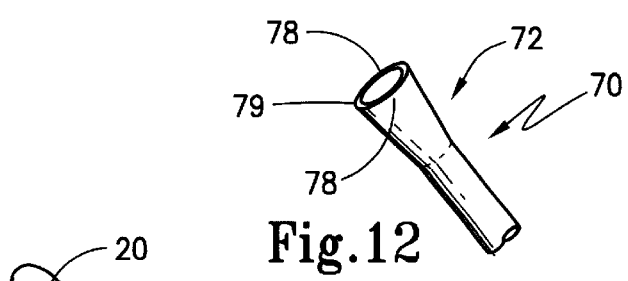
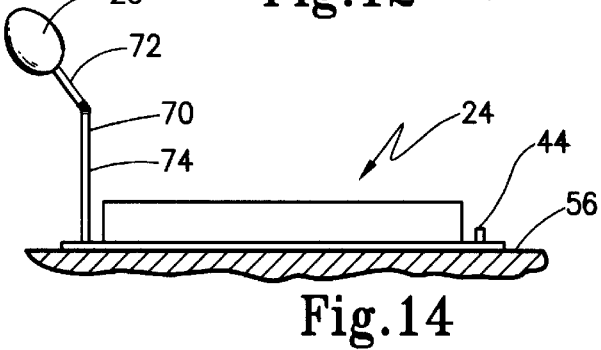

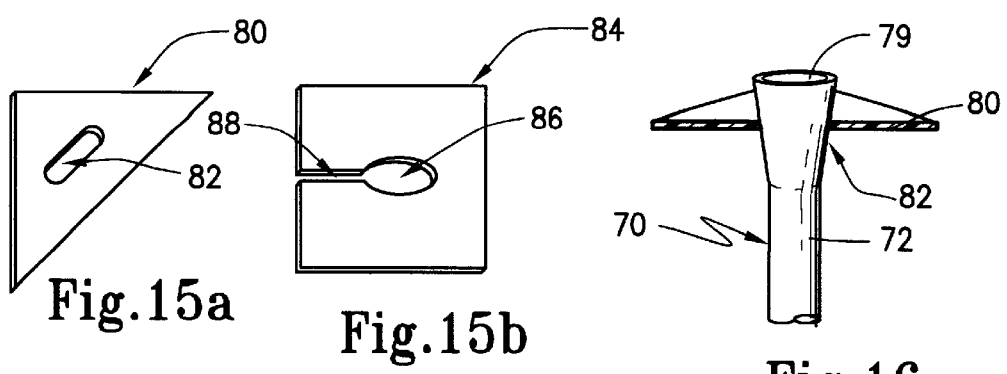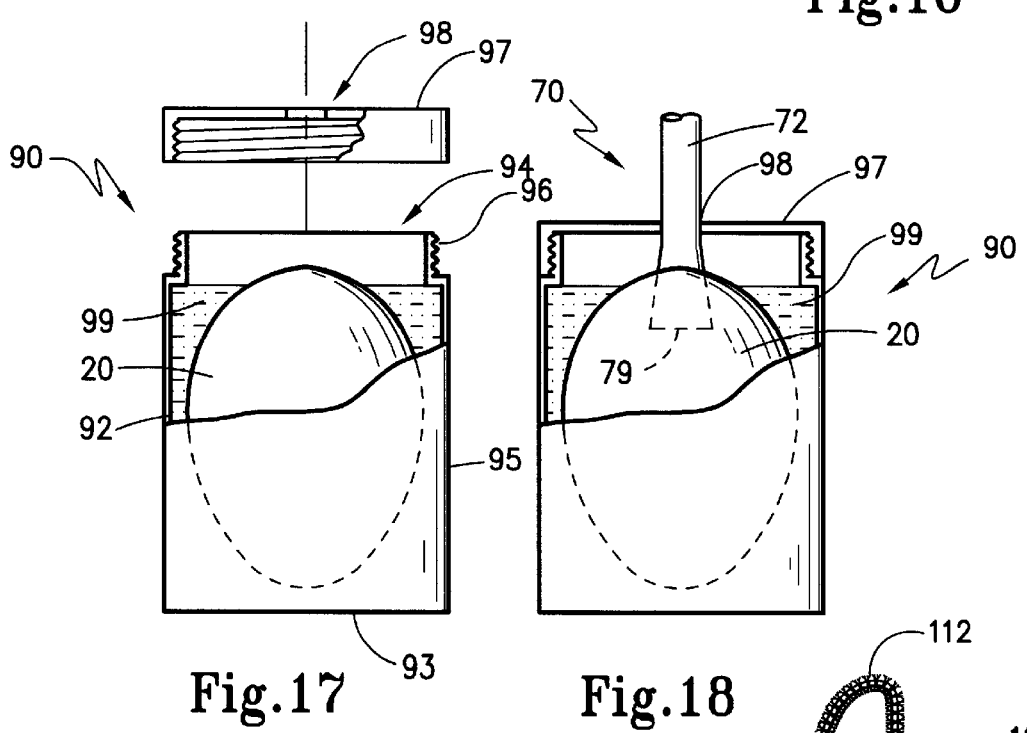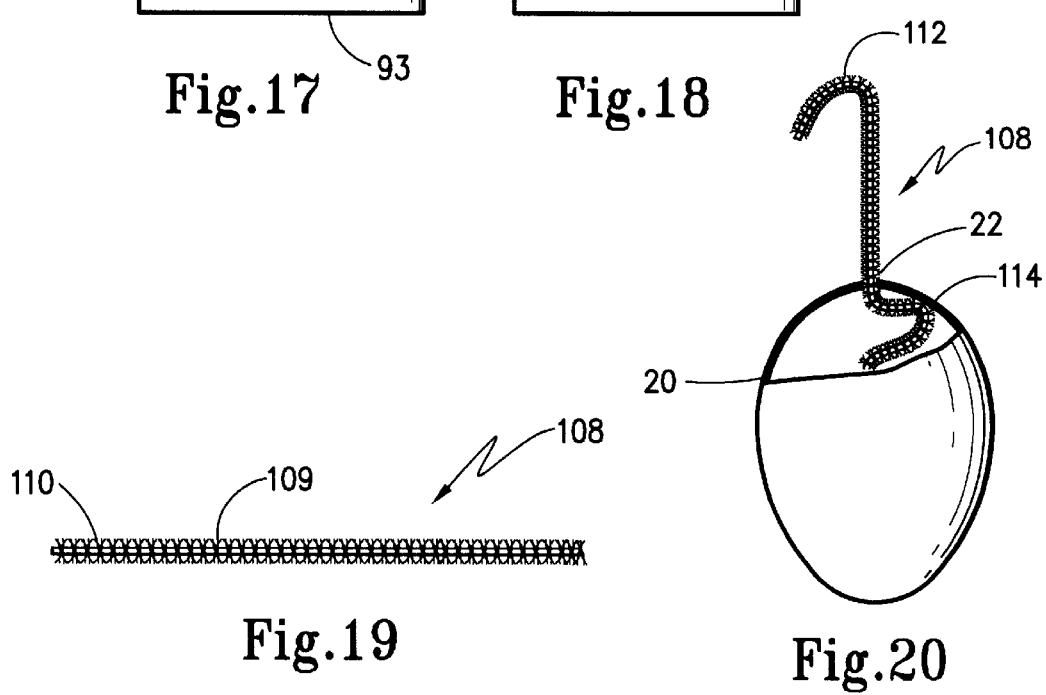

EGG CLEANING AND DECORATING METHOD AND KIT THEREFOR

FIELD OF THE INVENTION

The present invention generally relates to the arts and crafts industry. More particularly, however, the present invention is directed to the decoration of the external surface of eggs utilizing coloring media, wraps, appliques and the like. Specifically, the present invention concerns a method and a kit for removing the contents of an egg, cleaning the shell and the subsequent decoration of the shell as an artistic medium.

BACKGROUND OF THE INVENTION

Due to their apparent symbolism for the continuity of life, eggs have often been used by divergent cultures as a medium of artistic expression. Egg decoration spans a range from simple coloration of the exterior surface of the egg to elaborate depictions of decorated eggs utilizing precious metals and gemstones. While most persons appreciate the beauty of an elaborately decorated egg as an object d'art, many people lack the skill, experience and/or patience necessary to go beyond the simple coloring or decorating of the eggshell.

The most simple form of egg decoration, as noted above, is the coloring of the exterior eggshell with one or more hues. Here, the egg is typically boiled in order to cook the albumen and vitellus contents thereof. This both stabilizes the egg for the decorative process and helps preserve the egg. Cooking the egg, though, is not entirely satisfactory. In this method, some eggs may be lost due to the cracking of the shell during the boiling procedure, and, in any event, the life of the finished product is limited due to the eventual spoilage of the cooked egg after a relatively short period of time.

Accordingly, it is known to remove the albumen and vitellus materials, commonly referred to as the yoke and white of the egg, prior to the decorative process. One technique to accomplish the removal of the egg contents is known as "egg blowing". In this procedure, the eggshell is pierced at two spaced locations, usually at opposite ends of the egg. A person then blows air into the interior of the egg through one of the holes. The elevated pressure resulting from this blowing procedure forces the contents of the egg out of the second opening so that a majority of the albumen and vitellus material is removed. The remaining shell may then be decorated, as desired.

Egg blowing, however, does have certain disadvantages and potential risks. On one hand, the formation of the pair of openings is often done utilizing a needle, pen or other sharp, pointed object that is forced through the eggshell. With this technique, there is more than an insignificant chance that the eggshell will become broken and unusable. Moreover, this technique is not desirable for small children due not only to the difficulty of creating the openings, but also due to the risk of injury from the piercing tool.

In addition, traditional egg blowing has some health risks. Many eggs are known to carry harmful bacteria that can infect a person during the egg blowing operation. Since this bacteria can be present both on the exterior of the egg and in the internal contents, even the careful cleansing of the egg before the egg blowing procedure does not entirely eliminate the possibility of a bacterial infection. In addition, regardless of the care and skill of the egg blower, some of the egg contents remain on the internal surface of the egg. Such residue can be the growth culture for microorganisms that will be present during the decoration and subsequent handling of the eggshell. Nonetheless, the removal of the contents of the egg and the subsequent decoration of the remaining eggshell is highly desirable since the decorated shell can, with proper care, exist indefinitely without spoilage.

For this reason, various instruments have been utilized to facilitate the removal of the albumen and vitellus material from the interior of the eggshell. For example, U.S. Pat. No. 3,855,915 issued Dec. 24, 1974 to Hoyt et al. discloses an egg blowing device that includes a bulb like air pump that is secured to a diaphragm that may be pressed against the eggshell. The diaphragm and the air pump include a spike that projects outwardly for piercing the eggshell. Holes are made in the opposite end of the eggshell and, upon compression of the pump, air is forced into the interior of the egg through one hole so that the albumen and vitellus materials are ejected from the eggshell out of the other hole. Thus, this device acts as a mechanical egg blower reducing the danger of bacterial contamination to a person employing such instrument.

U.S. Pat. No. 5,289,762 issued Mar. 1, 1994, to Phillips, U.S. Pat. No. 5,297,477 issued Mar. 29, 1994 to Phillips and U.S. Pat. No. 5,317,962 issued Jun. 7, 1994 to Phillips all disclose various egg evacuation devices through a single hole in the eggshell. Each device provides a hollow tube which extends through the hole in the eggshell. The hollow tube is mounted to a seat on which the egg rests, and the seat provided with an egg collection passageway. On the '762 patent and the '972 patent provide a suction to remove the egg contents. A mechanism for flushing the interior of the egg is provided in one embodiment of the '762 patent. The '477 patent utilizes positive air pressure which is injected through a tube extending through the hole in the eggshell. Positive pressure causes the egg contents to flow out of the hole around the tube and into a chute so it may be discarded.

U.S. Pat. No. 4,182,234 issued Jan. 8, 1980 to Reed discloses an egg contents remover. Here, a pair of tubes are inserted through the eggshell and into the interior thereof. One of the tubes provides an air inlet for forcing compressed air into the egg causing its contents to remove through the other, discharge tube. Compressed air may be provided by manually actuated pump.

Despite the developments disclosed in the respective patents, there remains a need for a simplified apparatus and method for removing the contents from a raw egg and preparation for decorating the same. There is a further need for a simple yet safe and hygienic egg cleaning device which can be produced in kit form either alone or with optional decorating items which kit facilitates the creation of highly decorative eggshells even by the artistically challenged. There is a further need for an apparatus and method that may be used to produce a hole in an eggshell with less risk of breakage for purposes of removing the interior contents from the raw egg. The present invention addresses such needs.

SUMMARY OF THE INVENTION

It is an object of the present invention to provide a new and useful method and kit for removing the contents of a raw egg thereby providing an eggshell that may be decorated as an artistic object.

Another object of the present invention is to provide a new method for forming a hole through the shell of an egg so that the albumen and vitellus contents may be removed therefrom with less risk of damage to the remaining eggshell.

A further object of the present invention is to provide an egg cleaning kit that is simple to use by persons of various artistic skill levels to clean a raw eggshell in preparation for decoration, and for decorating the same.

Yet another object of the present invention is to provide an inexpensive egg cleaning and decorating kit that is easy to use yet which produces a highly decorative egg art.

Still a further object of the present invention ids to provide a method and kit for cleaning an egg that decreases the risk of contamination, bacterial growth and the like so as to provide an improved hygienic approach to egg cleaning and decorating.

To accomplish these objects, the egg cleaning kit according to the present invention is adapted for removing the contents of a raw egg from the interior therefor so that an exterior surface of the shell may be subjected to a manual decorative process. In a first embodiment, the egg cleaning kit includes a hole former that is operative upon use by the decorator to produce an opening of selected size and shape through the shell of a raw egg. An injector is then provided, and the injector includes a nozzle that is sized and adapted to be inserted through the opening to project into the interior of the shell. The injector is operative upon use by the decorator to introduce air into the interior thereby ejecting the contents of the raw egg from the shell. A holder is also provided in order to support the eggshell after removal of its internal contents. This holder includes a first portion that is operative engage the shell after removal of the contents and a second portion that is adapted to be manually grasped by the decorator such that the decorator can manipulate the shell during the decorative process.

Preferably, the hole former includes a piece of sandpaper, such as a wet and dry type having a grit size within a range of about 100 to 150, inclusive. The hole former also preferably includes a support for the piece of sandpaper. The support has a longitudinally extending rib upon which the piece sandpaper is longitudinally positioned. The support may also include a channel member that has a longitudinally extending channel with a bottom surface and a pair of upwardly disposed channel sidewalls which are spaced apart from one another sufficiently so as to accommodate the shelf or sliding movement therein. The rib is then centrally located in the channel along the bottom surface. The channels thus support lateral side portions of the egg during sliding movement as one end of the egg is moved along the sandpaper and rib thereby sanding and avoid opening therein.

The egg cleaning kit can also include a stand that is adapted to rest on a support surface. This stand is operative to engage the second portion of the holder and to support the first portion of the holder such that the eggshell is held in a suspended relationship relative to the support surface. Preferably, the stand and the channel member are formed as a integral one piece construction and may also be part of the packaging, such as a plastic blister, in a blister pack package containing the remainder of the components of the kit.

The injector is preferably a bellows pump that includes a hollow compressible body portion having an injector bottom wall, a top opposite the bottom wall and a surrounding injector sidewall. The sidewall is formed as bellows or accordion-type structure. The injector has a nozzle that extends outwardly from the top of the body portion so as to inject air when the nozzle is positioned inside the egg. To this end, the nozzle is elongated and preferably has a length of at least ¾ inch (1.9 cm).

The holder is preferably formed of a plastic material and is configured as an elongated cylindrical tube. To this end, it may be strawlike. In any event, the first portion of the holder has a resilient end so as to resiliently engage the eggshell when inserted into the opening therein. The first and second portions of the holder are each preferably linear elements, and a bendable joint interconnects the first and second portion. This bendable joint is constructed so as to allow the adjustable positioning and the adjustable retention of the first and second linear portions at different oblique angles with respect to one another. A guide element may be provided as part of the kit in order to pre-form the free end of the first portion of the holder into a shape similar to the opening of the shell.

A dying container may also be provided as part of the kit. Here, the container defines an enclosed chamber having a container interior sized and adapted to receive both the shell and the decorative fluid therefor. The container has a mouth opening through which the shell and decorative fluid may be introduced and includes a removable lid secured thereto so that the eggshell may be completely immersed in the dying fluid. To this end, also, the lid may include a port that engages the holder so that the holder will be frictionally retained in the lid and will resiliently retain the eggshell so as to hold the eggshell in a submerged relationship with respect to the decorative fluid.

The egg cleaning kit may include decorative materials so that it is both a cleaning and decorating kit. The decorative material is used in decorating the exterior shell of the egg, and this decorative material may be selected from a group consisting of: dyes, paints, inks, foils, decals, string, beads, glitter, stickers, wax stickers, fabric, paper and feathers.

The method according to the present invention then includes all of those steps implicit in the various elements of the kit. More specifically, however, a method of treating a raw egg for decorative purposes is provided which comprises a first step of forming an ovoid opening through the outer shell of the egg at a first selected location. Air is then injected into the interior of the egg at a second location remote from the first location at a pressure sufficient to eject the fluid contents out of the ovoid opening.

The method according to the present invention accomplishes the step of forming the ovoid opening by sanding away an area of the out shell, preferably without penetrating the membrane that surrounds the albumen and vitellus contents of the egg. This method includes the step of supporting a piece of sandpaper on a longitudinally extending rib and thereafter sliding the outer shell longitudinally along the rib and sandpaper. This procedure also includes the step guiding the lateral side portions of the outer shell during the sliding movement thereof. The method may also include the step of providing a holder that has a first resilient portion and a second portion adapted to be manually grasped by the decorator so that the decorator can manipulate the shell during the decorative process. To this end, the method includes the step of engaging the ovoid opening with the resilient first end of holder. This method may also include the optional step of injecting a cleaning fluid, such as water, into the interior of the shell after injecting the fluid contents through the raw egg thereby to wash the albumen and vitellus residue therefrom. The method of cleaning and decorating the egg then includes the further step of decorating the outer exterior surface of the shell while on the holder.

These and other objects of the present invention will become more readily appreciated and understood from a consideration of the following detailed description of the exemplary embodiment(s) when taken together with the accompanying drawings, in which:

BRIEF DESCRIPTION OF THE DRAWINGS

FIG. 1 is a perspective view of an egg cleaning and decorating kit, including the packaging therefor, according to a first exemplary embodiment of the present invention;

FIG. 2 is an exploded side view in elevation of an injector pump according to the present invention, with a portion of the body broken away;

FIG. 3 is a side view in elevation and impartial cross-section showing the injection of pressurized air into the interior of a raw egg;

FIG. 8 is a side view in cross-section showing the support of FIGS. 4–6 receiving the sandpaper strip of FIG. 7;

FIG. 9 is an end view in cross-section showing the support of FIGS. 4–6 receiving the sandpaper strip of FIG. 7 and showing the placement of a raw egg thereon for purposes of forming an end opening in the egg;

FIG. 10 is a cross-sectional view of the egg of FIG. 9 showing the ovoid opening formed therein according to the present invention;

FIG. 11 is a side view, partially broken away, showing the straw-like holder according to the present invention;

FIG. 12 is a perspective view of a first end portion of the holder of FIG. 11 in a deformed state for insertion into the egg opening of FIG. 10;

FIG. 13 is a cross-sectional view of an egg, similar to the view shown in FIG. 10, but receiving the deformed end portion of the holder of FIGS. 11 and 12;

FIG. 14 is a side view in elevation showing the support stand of FIGS. 4–6 mounting the holder of FIG. 11 for supporting an egg according to the present invention;

FIG. 15(a) is a perspective view showing a first exemplary embodiment of a guide for deforming the end portion of the holder, as is shown in FIG. 12;

FIG. 15(b) is a perspective view showing a second embodiment of a guide according to the present invention;

FIG. 16 is a perspective in cross-section showing the guide of FIG. 15(a) receiving and pre-forming the end portion of the holder of FIG. 11;

FIG. 17 is a side view in partially cross-section and exploded showing a container according to the present invention with this container receiving a decorating fluid and an egg therein;

FIG. 18 is a side view in elevation, partially broken away, showing the container of FIG. 17 in a sealed state and receiving an egg therein held in position by the holder of FIG. 11;

FIG. 19 is a side view in elevation of a piece of decorative material that can also be used as a mounting bracket for a decorated egg;

FIG. 20 is a side view in elevation, partially broken away, showing the use of the strand of FIG. 19 as a bracket for a decorated egg.

DETAILED DESCRIPTION OF THE EXEMPLARY EMBODIMENTS

Figure 4:
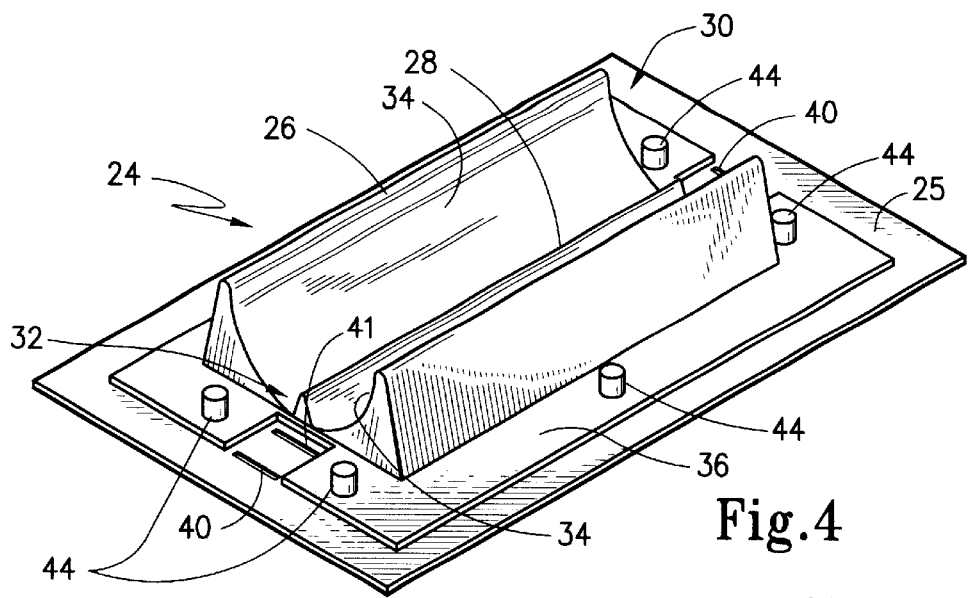
FIG. 4 is perspective view showing the support structure for the hole former according to the present invention.

The present invention is directed to an egg cleaning kit or, alternatively, an egg cleaning kit that is operative to remove the contents of a raw egg from the interior of the eggshell so that an exterior surface of the shell may be subjected to a manual decorative process by a decorator. The present invention also concerns a method of treating a raw egg for decorative purposes. The present invention further contemplates an egg decorating kit that expands upon the egg cleaning kit to provide materials for the artistic decoration of the exterior shell of a cleaned egg as well as a method for decorating such egg.

A preferred form of the present invention is depicted in FIG. 1. In FIG. 1, it may be seen that egg cleaning and decorating kit 10 includes an outer package in the form of a box 12 that is adapted to receive the elements of the egg cleaning and decoration kit in a box interior 14 thereof. The construction of box 12 is of no particular relevance to the scope of the present invention, and it should be understood that box 12 could be replaced by any suitable container for the kit.

In any event, various elements of egg cleaning and/or decoration kit 10 are generally shown in FIG. 1. These include a hole former that includes a support 20 and a strip of sandpaper 50 that is adapted to be mounted on and retained by support 20 for purposes of forming an opening in a raw egg. Kit 10 further includes an injector or pump 60, a plurality of straw like holders 70, a guide element 80, a container 90 and a plurality of decorative materials, such as a dye strip 100 having a plurality of different dying tablets 102, a decorative string 104, a foil wrap 106 and a plurality of decorative wires 108 that may also serve as suspension brackets for a decorated egg. The structure of each of these individual elements is described more thoroughly below.

Turning, then, to FIGS. 2 and 3 it may seen that injector pump 60 includes a hollow compressible body portion 61 having a bottom 62, a top 63 that is opposite bottom wall 62 and a surrounding injector sidewall 64 that is formed as a bellows structure so that top 63 and bottom wall 62 may compress and expand towards and away from one another. An elongated nozzle 65 is removably secured to the top 63 of injector pump 60 with elongated nozzle 65 preferably having a length of at least three quarter inch (1.9 cm).

As is shown in FIG. 3, nozzle 65 is sized and adapted for insertion through an opening 22 formed in shell 20 of raw egg 16 so that air may be injected into the interior 17 of egg 16 under a pressure that is greater than ambient pressure. Preferably, the egg 16 should be tipped, and the tip of nozzle 65 inserted into the interior 17 of egg 16 at a spaced location from opening 22 yet leaving sufficient space between shell 20 and the top 63 of pump 60 for the fluid contents to eject from opening 22 without soiling either the pump 60 or the hand of the decorator. When air is injected, interior 17 becomes pressurized thereby ejecting the contents 18 (in the form of the albumen and the vitellus) from shell 20 through opening 22.

Furthermore, after all of the contents 18 have been ejected, it should understood that nozzle 65 may be removed from body portion 61 (FIG. 2) and body portion 61 may be filled with a cleaning fluid, such as water, and nozzle 65 then reattached. The nozzle may be then reinserted through opening 22 so that water may be injected onto the interior surface of shell 20 to clean the residue of the vitellus and albumen therefrom.

Figure 5:
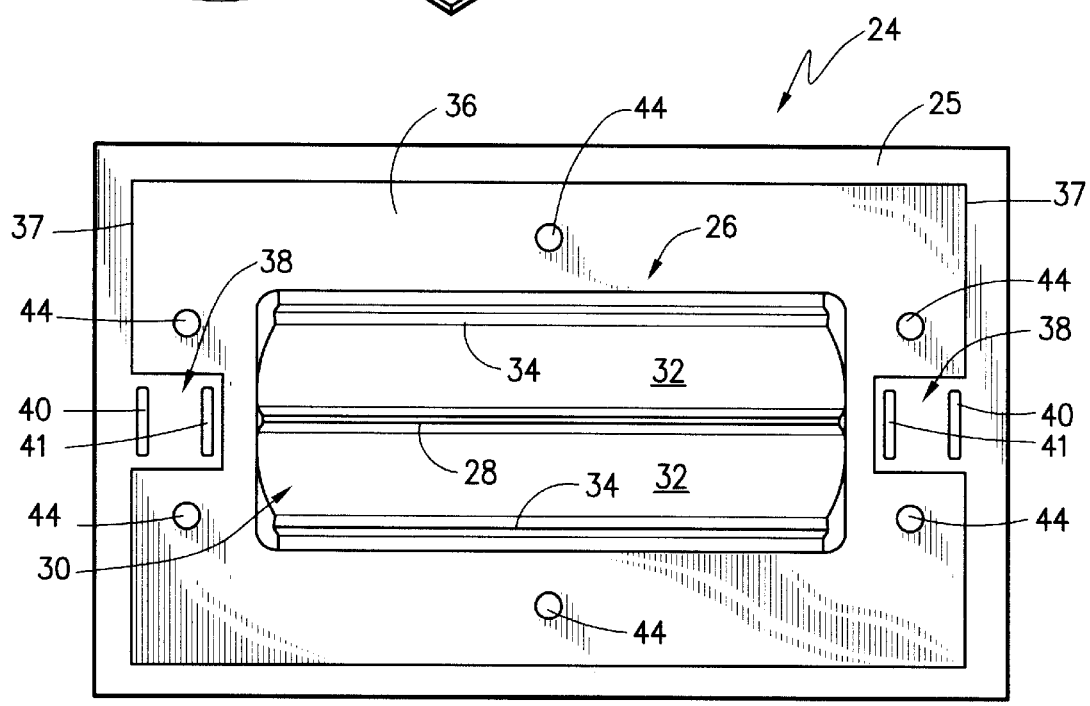
FIG. 5 is a top plan view of the support shown in FIG. 4.
Figure 6:
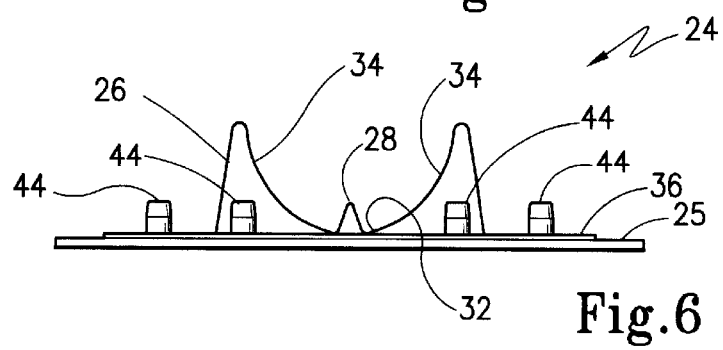
FIG. 6 is an end view in elevation showing the support of FIGS. 4 and 5.

Support stand 24 is best shown in FIGS. 4–6. Here it may be seen that support stand 24 includes a backing card 25 and a support 26 which together support sandpaper strip 50, as described below. Support 26 includes a longitudinally extending rib 28 that is formed along a bottom surface 32 of a channel member 30. Channel member 30 has a longitudinally extending channel formed by bottom surface 32 and a pair of upwardly disposed channel sidewalls 34 that are spaced apart from one another sufficiently so as to accommodate the size of an eggshell for sliding movement therein. Rib 28 is centrally located in the channel along bottom surface 32.

Support stand 24 has a flat base portion 36 that mounts channel structure 30 thereon and is preferably molded therewith. Base 36 is secured, in any convenient manner, to backing card 25. For example, base 36 may be adhered to backing card 25 by any acceptable adhesive. The opposite end edges 37 of base 36 are each provided with a notch 38 so as to expose a surface area of backing card 25. Backing card 25 then has two pair of slots 40, 41 that are located within notch 38 and which extend transversely with respect to rib 28. The slot pairs 40, 41 are adapted to receive and retain opposite end portions of sandpaper strip 50, as described more thoroughly below. Base 36 also has a plurality of upwardly projecting protrusions 44 which define mounting posts for holders 70, also as described more thoroughly below.

Figures 7, 21:
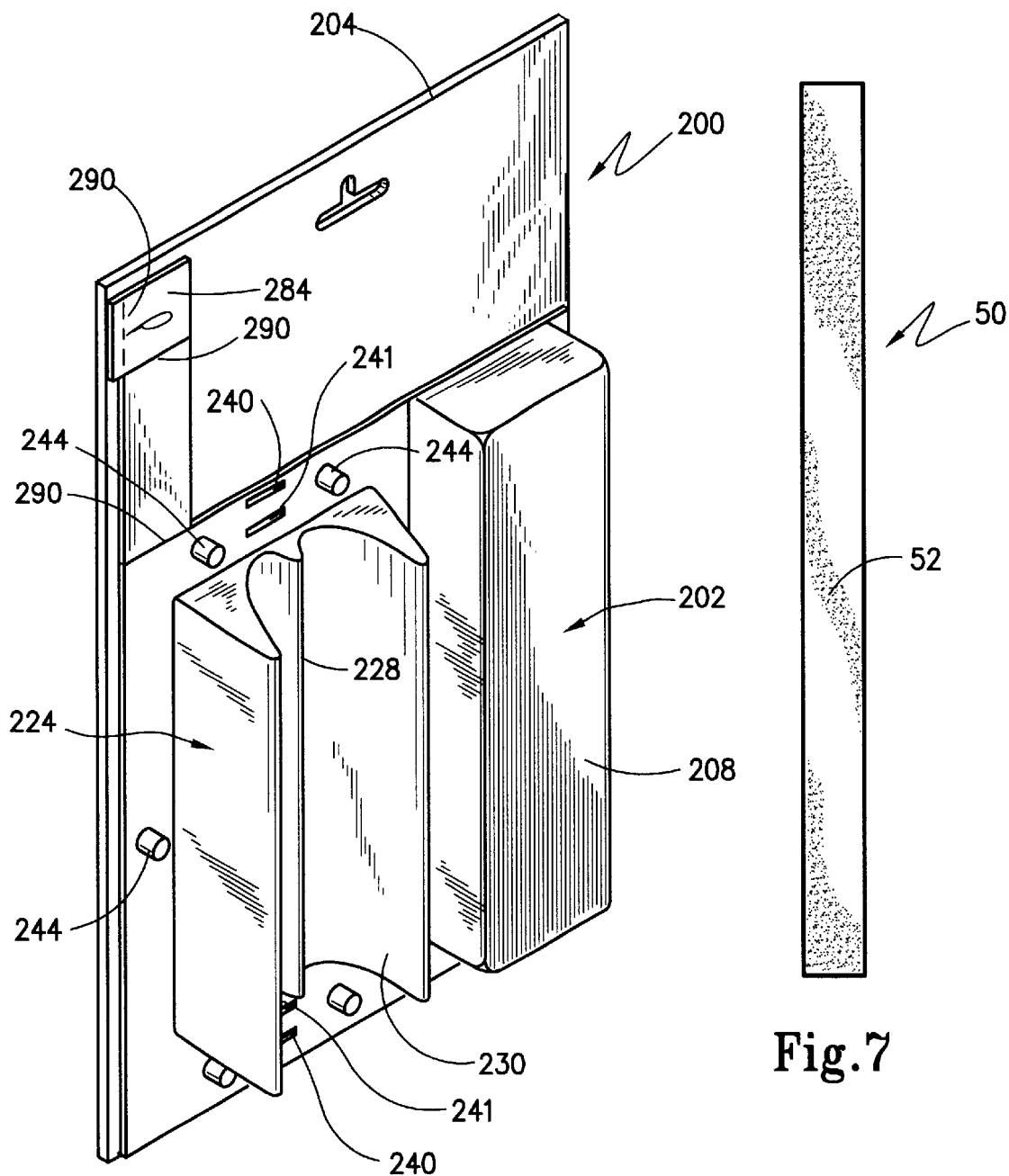
FIG. 7 is a top plan view showing a sandpaper strip used as a hole former according to the first exemplary embodiment of the present invention.
FIG. 21 is a perspective view showing an alternative packaging for the present invention.

With reference now to FIG. 7, it may be seen that sandpaper strip 50 is an elongated piece of material that has an upper surface 52 provided with a sanding grit as is known in the art. Strip 50 is preferably about one-half inch (1.25 cm) wide and ten to twelve inches (25–30 cm) long. Sandpaper strip 50 is preferably a wet and dry type having a grit size preferably within a range of about 100–150, inclusive.

With reference again to FIG. 5 but also with respect to FIGS. 8 and 9, it may be seen that support stand 24 is operative to support sandpaper strip 50. To this end, as is shown in FIG. 8, sandpaper strip 50 extends longitudinally and is supported by rib 28. The opposite end portions of sandpaper strip 50 are then threaded downwardly through slots 41 and upwardly through slots 40 so as to securely retain the longitudinal of extension of sandpaper strip 50 on top of and along rib 28. As is shown in FIG. 9, egg 16 may be placed in channel 30 for sliding movement therealong with one end portion 54 of egg 16 in contact with sandpaper strip 50 so as to sand away a small area of shell 20 to create opening 22. To this end, sidewalls 34 support lateral portions of egg 16 during the sliding movement the sliding and sanding operation in channel 30.

With reference again to FIG. 9, it may be seen that support 26 may be a piece of plastic material that may be suitable vacuum formed or injection molded. Thus, sidewalls 34 of channel 30 are inverted u-shaped structures such that sidewall 34 is buttressed by brace walls 35 that extend upperwardly from base 36. Protrusions 44 are inverted cylindrical posts, also formed out of base 36. Finally, it may be seen that rib 28 is an inverted, V-shaped configuration configured out of bottom surface 32.

After egg 16 is slid along rib 28 and sandpaper strip 50, an opening 22 becomes formed in the shell 20 of egg 16, as is shown in FIG. 10. It should be understood that, by virtue of the configuration of rib 28, opening 22 is ovoid in shape. By this, it is meant that opening 22 is preferably oval or elliptical in configuration although it is certainly within the scope of embodiments of the present invention that opening 22 be of a different geometrical construct. For example, opening 22 would be circular where the egg decorator places sandpaper strip 50 on a flat surface and sands the end 54 of egg 16 without the benefit of supporting the sandpaper strip 50 on rib 28. Moreover, it should be appreciated that the step of sanding the ovoid opening has accomplished to remove that area of shell 20 without rupturing the internal membrane of egg 16. This membrane may then be easily pierced by nozzle 65 of injector pump 60.

Turning to FIGS. 11 and 12, it may be seen that a suitable holder 70 for an egg 16 includes a first portion 72 that is operative to engage the eggshell after removal of the contents thereof and to support the shell during the decorative process and a second portion 74 that is adapted to be manually grasped by the decorator so that the decorator can manipulate the shell during the decorative process. First and second portions 72 and 74 are each linear elements that are interconnected by a bendable joint 76 that is constructed to allow the adjustable positioning and retention of first and second portion 72 and 74 at different oblique angles "a" with respect to one another. It should be appreciated, however, that the use of joint 76 is optional without departing from the scope of this invention.

In any event, holders 70 are constructed of a resilient material, such as a plastic, and may be a common plastic straw, if desired. It is important, however, that at least end portion 72 be both deformable and resilient. This allows it to be deformed to engage opening 22, as is shown in FIGS. 12 and 13. In FIG. 12, it may be seen that holder 70 is constructed as an elongated cylindrical tube. However, end portion 72 may be collapsed by moving diametric portions 78 of its sidewall closer together. Thus, end 79 takes an oval configuration that may be inserted into opening 22 of shell 20, as is shown in FIG. 13. Releasing the compression on end portion 72 allows end portion 79 to attempt to return to its original circular shape thus frictionally engaging the side edges 23 of opening 22. This releasably retains egg 16 on egg holder 70 during the decorative process.

As is shown in FIG. 14, egg 16 can further be supported by means of support stand 24 which rests on a support surface 56. To this end, the second portion of holder 70 engages a selected protrusion 44 by telescopic mated engagement therewith so that holder 70 is positioned in an upright orientation with first portion 72 extending above support surface 56. This then holds egg 16 in a suspended relation relative to support surface 56. By spacing protrusions 44 relatively uniformly around the perimeter of base 36 (see FIG. 5) it may be appreciated that a plurality of decorated eggs may be held and suspended in defilation without contacting each other. To this end, also, bendable joint 76 allows the positioning of decorated eggshells 20 so they are not in contact with one another.

To assist in the deformation of end portion 72 of holder 70, a guide piece may be provided. Alternative guide pieces are shown, respectively, in FIGS. 15(*a*) and 15(*b*). In FIG. 15 (*a*), guide element 80 is in the form of a triangular piece of plastic having an ovoid opening 82 formed therein. Ovoid opening 82 is designed to receive a deformed end 79 of holder 70 so as to retain the deformed shape of first end 72 during insertion thereof into opening 22 of shell 20. Thus, as is shown in FIG. 16, first end 72 of a representative holder 70 is deformed and received in ovoid opening 82 so that end 79 is retained in the deformed state. End 79 may then be inserted into an opening 22 in a shell 20 after which guide 80 may be advanced toward second portion 74 thereby allowing end 79 to expand into contact with edges 23 of the opening 22.

Alternative guide 84 includes an ovoid opening 86 formed therein with a small slit 88 extending from a peripheral edge of guide 84 to intersect ovoid opening 86. Thus, opening 86 and slit 88 form a keyhole configuration allowing the guide 84 to be removed radially from holder 70 after end 79 is inserted into opening 22.

With reference now to FIGS. 17 and 18, it may seen that the egg cleaning and decoration kit of the present invention may also include one or more containers such as container 90 has a cylindrical reservoir section 92 having a bottom 93, and open mouth 94 opposite bottom 93 and a cylindrical surrounding sidewall 95. Rim 96 is threaded so as to receive a lid 97 reservoir section 92 contains a quantity of decorative fluid 99 such as a food safe dye, paint or other decorative substance. Reservoir section 92 is sized sufficiently for close nested receipt of eggshell 20 inserted through mouth opening 94 so that only a minimum amount of fluid is necessary to dye or otherwise decorate the eggshell 20. To this end, it should be appreciated that eggshell 20 is completely submerged in 20 decorative fluid 99.

However, due to the buoyant nature of shell 20, it is sometimes desirable to force shell 20 beneath the surface level of fluid 99. To this end, lid 97 is provided with a centrally located axial port 98 that is sized and adapted to receive first portion 72 of a holder 70. Thus, lid 97 may be mounted on a holder 70 by first sliding second portion 74 of holder 70 through port 98 and toward end 79. The assembly of holder 70, lid 97 and shell 20 may then be inverted and shell 20 immersed in decorative fluid 99. Port 98 frictionally engages holder 70 so that a force resists the buoyancy of shell 20 with this assembly.

After an egg is decorated, it desirable to suspend it from a display support. To this end, a plurality of bendable hangers 108 are provided, as is shown in FIGS. 19 and 20. Bendable hangers 108 may be in a form similar to the commonly known pipe cleaner. Here, each includes a wire spine 109 and a generally radially protruding mass 110 supported by spine 109. Mass 110 can be suitable fabric material, foil, etc. as is known in the art. In any event, as is shown in FIG. 20, opposite ends 112 and 114 of hanger 108 may be bent in a desired manner. For example, end portion 114 may be bent and inserted through opening 22 and shell 20 so that shell 20 may be suspended when the central portion of hanger 108 is oriented vertically. End portion 112 of hanger 108 may be bent into a hook so as to hang on a suitable decorative support.

As noted above, the egg cleaning and decoration kit 10 can include decorative elements. Such elements can include a plurality of hangers 108 that can be used for decoration. In addition, decorative element such as dying tablets 102 for use with container 90, string 104, foil wraps 106 and the like can be provided. Preferably, the decorative material included in the egg cleaning and decorating kit is selected from a group consisting of: dyes, paints, inks, foils, decals, string, beads, glitter, stickers, wax stickers, fabric, paper and feathers. It should be understood, though, that this list is not exhaustive so that other substances and items that would be used by the artisan are included within the definition of decorative materials.

Turning now to FIG. 21, an alternative packaging for the egg cleaning and decorating kit is shown. Here, a cleaning and decorating kit 200 is shown packaged as a blister pack including a plastic blister 202 secured to a backer card 204. Support stand 224 is constructed substantially identical as support stand 24 including a channel structure 230 having a longitudinal extending rib 228 and a plurality of upstanding protrusions 244. In this embodiment, however, notches 38 are not present. Instead, slots 240 are formed directly in the blister pack 202 so that the plastic blister may be removed from backing card 204 and used as the support stand and sanding channel. It should be apparent from this embodiment that the stand and the channel member can be formed as an integral one-piece construction.

Here, also, an enlarged plastic bubble 208 provides a receptacle for containing the various components of the cleaning and decorating kit, such as the sandpaper strip, the injector pump, the eggshell holders, the container and the decorative materials, as described above. In this embodiment, though, guide member 280 is formed as a plastic extension of blister 202 and a plurality of score lines 290 are provided to allow severance of guide 284 from the support stand 224.

From the foregoing, and as noted above, it should now be appreciated that the present invention also concerns a method of treating a raw egg for decorative purposes and a method of decorating a cleaned eggshell. The method includes those steps which can be implemented by the elements of the kit as described above. In particular, the present invention concerns the method of treating a raw egg for decorative purposes when the egg has an outer shell, an exterior surface, an interior and fluid contents including albumen and vitellus material contained within the interior. The broad method includes a first step of forming an ovoid opening through an outer shell of the egg at a first selected location. Preferably, this step is accomplished without penetrating the membrane of the egg that contains the albumen and vitellus material and which membrane is between that material and the interior surface of the out shell. A second step is then performed wherein air is injected into the interior of the egg at a second location remote from the first location where the opening is formed. The air is injected at a pressure sufficient to inject the fluid contents out of the ovoid opening.

The step of forming the ovoid opening is preferably accomplished by sanding away an area of the outer shell. This method can also include the step of supporting a piece of sandpaper on a longitudinally extending rib and thereafter sliding the outer shell of the egg longitudinally along the rib and sandpaper. Here, also, the method may include the step of guiding lateral side portions of the outer shell during the sliding movement thereof along the rib and sandpaper.

This method can further include the step of providing a holder that includes a resilient first portion and a second portion that is adapted to be manually grasped by the decorator such that the decorator can manipulate the shell during the decorative process. This, then, includes the step of engaging the ovoid opening with the resilient first portion of the holder.

This method can further include the step of injecting a cleaning fluid, such as water, into the interior of the shell after the step of injecting the fluid contents of the raw egg thereby to wash albumen and vitellus residue from the interior of the shell. Where the method continues to provide for decoration of the egg, the method includes the supporting of the shell on a holder and decorating the exterior surface of the shell while it is on the holder.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiment of the present invention without departing from the inventive concepts contained herein.

I claim:

1. An egg cleaning kit adapted for removing contents of a raw egg from the interior of a shell therefor so that an exterior surface of said shell may be subjected to a manual decorative process by a decorator, comprising:

(a) a hole-former operative upon use by the decorator to produce an opening of selected size and shape through the shell of said raw egg;

(b) an injector including a nozzle sized and adapted to be inserted through the opening into the interior of said shell, said injector operative upon use by the decorator to introduce air into the interior at a pressure greater than ambient pressure whereby the interior becomes pressurized thereby to eject the contents of said raw egg from the shell; and (c) a holder including a first portion operative to engage said shell after removal of the contents thereof and to support said shell during the decorative process and a second portion adapted to be manually grasped by the decorator such that the decorator can manipulate said shell during the decorative process.

2. An egg cleaning kit according to claim 1 wherein said hole-former includes a piece of sandpaper.

3. An egg cleaning kit according to claim 2 wherein said sand paper is a wet and dry type having a grit size within a range of about 100 to 150, inclusive.

4. An egg cleaning kit according to claim 2 wherein said hole-former includes a support for said piece of sandpaper, said support having a longitudinally extending rib operative to support said piece of sandpaper.

5. An egg cleaning kit according to claim 4 wherein said support includes a channel member having a longitudinally extending channel with a bottom surface and a pair of upwardly disposed channel sidewalls spaced-apart from one another sufficiently so as to accommodate the shell for sliding movement therein, said rib being centrally located in the channel along the bottom surface thereof.

6. An egg cleaning kit according to claim 5 including a stand adapted to rest on a support surface, said stand operative to engage the second portion of said holder and to support the first portion of said holder such that the shell engaged thereby is held in a suspended relation relative to the support surface.

7. An egg cleaning kit according to claim 6 wherein said stand and said channel member are formed as an integral one-piece construction.

8. An egg cleaning kit according to claim 7 including a blister package for contents of said kit, said blister package having a plastic blister secured to a backing card, said channel member and said stand being molded as part of said plastic blister.

9. An egg cleaning kit according to claim 1 wherein said injector includes a hollow, compressible body portion including an injector bottom wall, a top opposite said bottom wall and a surrounding injector sidewall formed as a bellows structure, said nozzle outwardly projecting from said top of said body portion.

10. An egg cleaning kit according to claim 9 wherein said nozzle is elongated and has a length of at least ¾ inch (1.9 cm).

11. An egg cleaning kit according to claim 1 wherein the first portion of said holder is resilient so as to resiliently engage the shell when inserted into the opening therein.

12. An egg cleaning kit according to claim 11 wherein said holder is formed of a plastic material and configured as an elongated cylindrical tube.

13. An egg cleaning kit according to claim 11 wherein said first and second portions are each linear element, and wherein said holder includes a bendable joint interconnecting said first and second portions, said joint constructed to adjustably position and adjustably retain said first and second portions at different oblique angles with respect to one another.

14. An egg cleaning kit according to claim 11 including a guide element adapted to engage an end of said first portion and to pre-form said end into a shape similar to the opening in the shell.

15. An egg cleaning kit according to claim 1 including a stand adapted to rest on a support surface, said stand operative to engage the second portion of said holder and to support the first portion of said holder such that the shell engaged thereby is held in a suspended relation relative to the support surface.

16. An egg cleaning kit according to claim 1 including a container defining an enclosed chamber having a container interior sized and adapted to receive both the shell and a decorative fluid therefor, said container having a mouth opening through which the shell and the decorative fluid may be introduced and including a removable lid secured thereto.

17. An egg cleaning kit according to claim 16 wherein said lid includes a port therethrough.

18. An egg cleaning kit according to claim 1 including a decorative material for use in decorating the exterior shell of said egg.

19. An egg cleaning kit according to claim 18 wherein said decorative material is selected from a group consisting of: dyes, paints, inks, foils, decals, string, beads, glitter, stickers, wax stickers, fabric, paper and feathers.

20. An egg cleaning and decorating kit adapted for removing contents of a raw egg from the interior of a shell therefor so that said shell may be subjected to a manual decorative process by a decorator, comprising:

(a) a hole-former operative upon use by the decorator to produce an opening of selected size and shape through the shell of said raw egg;

(b) an injector including a nozzle sized and adapted to be inserted through the opening into the interior of said shell, said injector operative upon use by the decorator to introduce air into the interior at a pressure greater than ambient pressure whereby the interior becomes pressurized thereby to eject the contents of said raw egg from the shell; and (c) a container having an interior sized and adapted to receive both the shell and a decorative fluid therefor and having sufficient depth so that the shell is completely submersible in the decorative fluid, said container having a mouth opening through which the shell and the decorative fluid may be introduced and including a removable lid secured to said enclosure to substantially seal the mouth and operative upon removal to allow placement of the shell and the decorative fluid completely within the interior of said container.

21. An egg cleaning and decorating kit according to claim 20 including a holder having a first resilient portion operative to resiliently engage said shell after removal of the contents thereof when inserted into the opening therein and to support said shell during the decorative process and a second portion adapted to be manually grasped by the decorator such that the decorator can manipulate said shell during the decorative process.

22. An egg cleaning and decorating kit according to claim 20 wherein said lid includes a port therethrough that is sized to receive and to frictionally engage said holder whereby said holder assists in submerging the shell in the decorative fluid when the shell and the decorative fluid are placed within the interior of said container.

23. An egg cleaning kit adapted for removing contents of a raw egg from the interior of a shell therefor so that an exterior surface of said shell may be subjected to a manual decorative process by a decorator, comprising:

(a) a hole-former operative upon use by the decorator to produce an opening of selected size and shape through the shell of said raw egg;

(b) an injector including a nozzle sized and adapted to be inserted through the opening into the interior of said shell, said injector operative upon use by the decorator to introduce air into the interior at a pressure greater than ambient pressure whereby the interior becomes pressurized thereby to eject the contents of said raw egg from the shell; and (c) a surface decoration material adapted to be applied to the exterior surface of the shell during the decorative process.

24. An egg cleaning kit according to claim 23 wherein said decorative material is selected from a group consisting of: dyes, paints, inks, foils, decals, string, beads, glitter, stickers, wax stickers, fabric, paper and feathers.

25. An egg cleaning kit according to claim 23 wherein said hole-former includes a piece of sandpaper and a support for said piece of sandpaper.

26. An egg cleaning kit according to claim 25 wherein said support includes a channel member having a longitudinally extending channel with a bottom surface and a pair of upwardly disposed channel sidewalls spaced-apart from one another sufficiently so as to accommodate the shell for sliding movement therein, said support including a longitudinally extending rib operative to support said piece of sandpaper with said rib being centrally located in the channel along the bottom surface thereof.

27. An egg cleaning kit according to claim 26 including a holder including a first portion operative to engage said shell after removal of the contents thereof and to support said shell during the decorative process and a second portion adapted to be manually grasped by the decorator such that the decorator can manipulate said shell during the decorative process.

28. An egg cleaning kit according to claim 27 including a stand adapted to rest on a support surface, said stand operative to engage the second portion of said holder and to support the first portion of said holder such that the shell engaged thereby is held in a suspended relation relative to the support surface.

* * * * *